(12) United States Patent
Weller et al.

(10) Patent No.: US 9,666,342 B2
(45) Date of Patent: May 30, 2017

(54) MAGNETO-DIELECTRIC POLYMER NANOCOMPOSITES

(71) Applicants: Thomas Weller, Lutz, FL (US); Jing Wang, Tampa, FL (US); Hariharan Srikanth, Tampa, FL (US); Cesar A. Morales-Silva, High Point, NC (US); Kristen L. S. Repa, Tampa, FL (US); Susmita Pal, Tampa, FL (US)

(72) Inventors: Thomas Weller, Lutz, FL (US); Jing Wang, Tampa, FL (US); Hariharan Srikanth, Tampa, FL (US); Cesar A. Morales-Silva, High Point, NC (US); Kristen L. S. Repa, Tampa, FL (US); Susmita Pal, Tampa, FL (US)

(73) Assignee: University of South Florida, Tampa, FL (US)

(*) Notice: Subject to any disclaimer, the term of this patent is extended or adjusted under 35 U.S.C. 154(b) by 0 days.

(21) Appl. No.: 15/160,233

(22) Filed: May 20, 2016

(65) Prior Publication Data

US 2016/0268027 A1 Sep. 15, 2016

Related U.S. Application Data

(63) Continuation-in-part of application No. 14/685,031, filed on Apr. 13, 2015, now Pat. No. 9,384,877.
(Continued)

(51) Int. Cl.
*H01F 37/00* (2006.01)
*H01F 1/37* (2006.01)
(Continued)

(52) U.S. Cl.
CPC .............. *H01F 1/37* (2013.01); *C08K 9/04* (2013.01); *H01B 3/006* (2013.01); *H01B 3/441* (2013.01);
(Continued)

(58) Field of Classification Search
CPC ............... H01F 1/36; H01F 1/37; H01F 1/375
See application file for complete search history.

(56) References Cited

U.S. PATENT DOCUMENTS

2008/0012163 A1 1/2008 Andrews et al.
2009/0053512 A1 2/2009 Pyun et al.
(Continued)

OTHER PUBLICATIONS

Low Loss Polymer Nanoparticle Composites for Radio Frequency (RF) Applications. Ta-I Yang. Dissertation on Oct. 10, 2008 Chem Engineering UMD. Retrieved from UMD digital Repository at the University of Maryland on Aug. 10, 2016. http://drum.lib.umd.edu/handle/1903/8767.*
(Continued)

*Primary Examiner* — Matthew E Hoban
(74) *Attorney, Agent, or Firm* — Molly L. Sauter; Smith & Hopen, P.A.

(57) ABSTRACT

In accordance with the present invention, novel superparamagnetic magneto-dielectric polymer nanocomposites are synthesized using a novel process. The tunability of the dielectric/magnetic properties demonstrated by this novel highly-viscous solvent-free polymer nanocomposite that is amenable to building 3D electromagnetic structures/devices by using processes such as 3D printing, compression molding or injection molding, when an external DC magnetic field is applied, exceeds what has been previously reported for magneto-dielectric polymer nanocomposite materials.

16 Claims, 16 Drawing Sheets

Related U.S. Application Data which is a continuation-in-part of application No. 14/107,725, filed on Dec. 16, 2013, now abandoned, which is a continuation of application No. 13/686,447, filed on Nov. 27, 2012, now abandoned, which is a continuation of application No. PCT/US2011/038366, filed on May 27, 2011.

(60) Provisional application No. 61/349,053, filed on May 27, 2010.

(51) Int. Cl.

| | | |
|---|---|---|
| H01F 1/34 | (2006.01) | |
| C08K 9/04 | (2006.01) | |
| H01F 1/00 | (2006.01) | |
| H01F 1/01 | (2006.01) | |
| H01B 3/00 | (2006.01) | |
| H01F 41/00 | (2006.01) | |
| H01B 3/44 | (2006.01) | |

(52) U.S. Cl.
CPC ............ *H01F 1/0018* (2013.01); *H01F 1/01* (2013.01); *H01F 1/344* (2013.01); *H01F 41/005* (2013.01); *C08K 2201/01* (2013.01); *C08K 2201/011* (2013.01)

(56) References Cited

U.S. PATENT DOCUMENTS

| | | |
|---|---|---|
| 2009/0114440 A1 | 5/2009 | Yamamoto et al. |
| 2010/0003503 A1 | 1/2010 | Seppala et al. |
| 2012/0154092 A1 | 6/2012 | Seppala et al. |

OTHER PUBLICATIONS

F. Namin, T. G. Spence, D. H. Werner and E. Semouchkina, "Broadband, Miniaturized Stacked-Patch Antennas for L-Band Operation Based on Magneto-Dielectric Substrates," IEEE Transactions on Antennas and Propagation, vol. 58, No. 9, pp. 2817-2822, Sep. 2010.
F. Erkmen, Chi-Chih Chen and J. L. Volakis, "Impedance Matched Ferrite Layers as Ground Plane Treatments to Improve Antenna Wide-Band Performance," IEEE Transactions on Antennas and Propagation, vol. 57, No. 1, pp. 263-266, 2009.
K. N. Rozanov, I. T. Iakubov, A. N. Lagarkov, S. A. Maklakov, A. V. Osipov, D. A. Petrov, L. Ryzhikov, M. V. Sedova and S. N. Starostenko, "Laminates of thin ferromagnetic films for microwave applications," The Sixth International Kharkov Symposium on Physics and Engineering of Microwaves, Millimeter and Submillimeter Waves and Workshop on Terahertz Technologies, 2007. MSMW '07., 2007, pp. 168-173.
Ta-I Yang, Rene N. C. Brown, Leo a Kempel, Peter Kofinas, "Magneto-dielectric properties of polymer—Fe3O4 nanocomposites" Journal of Magnetism and Magnetic Materials 320 (2008) pp. 2714-2720.
R.C. Hansen and M. Burke, "Antennas with magneto-dielectrics," Microwave Optical Technology Letters, vol. 26, No. 2, pp. 75-78, Jul. 2000.
H. A. Wheeler, "Transmission-Line Properties of Parallel Strips Separated by a Dielectric Sheet," IEEE Transactions on Microwave Theory and Techniques, vol. 13, No. 2, pp. 172-185, 1965.
S. Sun and H. Zeng, "Size-Controlled Synthesis of Magnetite Nanoparticles," Journal of the American Chemical Society., vol. 124, No. 28, pp. 8204-8205, Jul. 2002.
Daiji Hasegawa, HaitaoYang, Tomoyuki Ogawa, MigakuTakahashi, "Challenge of ultra high frequency limit of permeability for magnetic nanoparticle assembly with organic polymer—Application of superparamagnetism," Journal of Magnetism and Magnetic Materials, 321 (2009) pp. 746-749.
L. Fu, V. P. Dravid and D. L. Johnson, "Self-assembled (SA) bilayer molecular coating on magnetic nanoparticles," Applied Surface Science, vol. 181, No. 1-2, pp. 173-178, 9/3, 2001.
N. A. Frey, S. Peng, K. Cheng and S. Sun, "Magnetic nanoparticles: synthesis, functionalization, and applications in bioimaging and magnetic energy storage," Chemical Society Reviews, vol. 38, No. 9, pp. 2532-2542, 2009.
Z. Xu, C. Shen, Y. Hou, H. Gao and S. Sun, "Oleylamine as Both Reducing Agent and Stabilizer in a Facile Synthesis of Magnetite Nanoparticles," Chemistry of Materials, vol. 21, No. 9, pp. 1778-1780, 2009.
J. L. Wilson, P. Poddar, N. A. Frey, H. Srikanth, K. Mohomed, J. P. Harmon, S. Kotha and J. Wachsmuth, "Synthesis and magnetic properties of polymer nanocomposites with embedded iron nanoparticles," Journal of Applied Physics, vol. 95, pp. 1439-1443, 2004.
C. Morales, J. Dewdney, S. Pal, S. Skidmore, K. Stojak, H. Srikanth, T. Weller and Jing Wang, "Tunable Magneto-Dielectric Polymer Nanocomposites for Microwave Applications," IEEE Transactions on Microwave Theory and Techniques, vol. MTT-59, pp. 302-310, 2011.
S. Pal, S. Chandra, M.H. Phan, P. Mukherjee and H. Srikanth, "Carbon nanostraws: nanotubes filled with superparamagnetic nanoparticles," Nanotechnology, vol. 20, No. 48, pp. 485604 (7), 2009.
K Stojak, S Pal, H Srikanth, C Morales, J Dewdney, T Weller and J Wang "Polymer nanocomposites exhibiting magnetically tunable microwave properties," Nanotechnology, vol. 22, No. 13, pp. 135602 (6), 2011.
S. Sun, H. Zeng, D. B. Robinson, S. Raoux, P. M. Rice, S. X. Wang and G. Li, "Monodisperse MFe2O4 (M = Fe, Co, Mn) Nanoparticles," Journal of the American Chemical Society, vol. 126, No. 1, pp. 273-279, 2004.
J. Gass, P. Poddar, J. Almand, S. Srinath and H. Srikanth, "Superparamagnetic Polymer Nanocomposites with Uniform Fe3O4 Nanoparticle Dispersions," Advanced Functional Materials, vol. 16, No. 1, pp. 71-75, 2006.
J.D. Hanawalt, H.W. Rinn and L.K Frevel, "Chemical Analysis by X-Ray Diffraction," Analytical Chemistry, vol. 10, No. 9, pp. 457-512, 1938.
B. Bakar and L.F. Lemmens, "Blocking temperature in magnetic nanoclusters," Physical Review E, vol. 71, pp. 046109 (1-7), 2005.
W. B. Weir, "Automatic measurement of complex dielectric constant and permeability at microwave frequencies," Proceedings of the IEEE, vol. 62, No. 1, pp. 33-36, Jan. 1974.
A. M. Nicolson and G. F. Ross, "Measurement of the intrinsic properties of materials by time-domain techniques," IEEE Transactions on Instrumentation and Measurement, vol. IM-19, No. 11, pp. 377-382, Nov. 1970.
E. Hammerstad and O. Jensen, "Accurate models for microstrip computer-aided design," in IEEE MTT-S International Microwave Symposium Digest, May 1980, pp. 407-409.
M. Kirschning and R. H. Jansen, "Accurate model for effective dielectric constant of microstrip with validity up to millimetre-wave frequencies," Electronics Letters., vol. 18, No. 6, pp. 272-273, Mar. 1982.
J. Barker-Jarvis, E. Vanzura, and W. Kissick, "Improved technique for determining complex permittivity with the transmission/reflection method," IEEE Transactions on Microwave Theory and Techniques, vol. 38, No. 8, pp. 1096-1103, Aug. 1990.
E. Yamashita, "Variational method for the analysis of microstrip-like transmission lines," IEEE Transactions on Microwave Theory and Techniques, vol. MTT-16, No. 8, pp. 529-535, Aug. 1968.
A. Farrar and A. T. Adams, "Multilayer microstrip transmission lines," IEEE Transactions on Microwave Theory and Techniques, vol. MTT-22, No. 10, pp. 889-891, Oct. 1974.
R. A. Pucel and D. J. Masse, "Microstrip propagation on magnetic substrates—Part I: Design theory," IEEE Transactions on Microwave Theory and Techniques, vol. MTT-20, No. 5, pp. 304-308, May 1972.

(56) References Cited

OTHER PUBLICATIONS

H. A. Wheeler, "Transmission line properties of parallel wide strips by a conformal mapping approximation," IEEE Transactions on Microwave Theory and Techniques, vol. MTT-12, No. 3, pp. 280-289, May 1964.

J. Svacina, "Analysis of multilayer microstrip lines by a conformal mapping method," IEEE Transactions on Microwave Theory and Techniques, vol. MTT-40, No. 4, pp. 769-772, Apr. 1992.

J. Svacina, "A simple quasi-static determination of basic parameters of multilayer microstrip and coplanar waveguide," IEEE Microwave and Guided Wave Letters, vol. 2, No. 10, pp. 385-387, Oct. 1992.

T. Kaneki, "Analysis of linear microstrip using an arbitrary ferromagnetic substance as the substrate," Electronics Letters, vol. 5, No. 19, pp. 463-465, Sep. 1969.

W. Eisenstadt and Y. Eo, "S-parameter-based IC interconnect transmission line characterization," IEEE Transactions on Components, Hybrids, and Manufacturing Technology, vol. 15, No. 4, pp. 483-490, Aug. 1992.

C. Morales, J. Dewdney, S. Pal, K. Stojak, H. Srikanth, J. Wang, and T. Weller, "Magnetically tunable nanocomposites for microwave applications," IEEE MTT-S International Microwave Symposium Digest, May 2010, pp. 1340-1343.

Edwin De La Cruz-Montoya and Carlos Rinaldi, "Synthesis and characterization of polymer nanocomposites containing magnetic nanoparticles," Journal of Applied Physics 107, 09B506, 2010.

Rogers Corporation, "ULTRALAM® 3000 Liquid Crystalline Polymer Circuit Material," datasheet RF1.3000, publication #92-125. http://www.rogerscorp.com/documents/730/acm/ULTRALAM-3000-LCP laminate-data-sheet-ULTRALAM-3850.aspx.

C.A Balanis, "Advanced Engineering Electromagnetics," John Wiley and Sons, Inc. 1989, pp. 181-243.

R.M. Cornell, U. Schwertmann, "The Iron Oxides: Structure, Properties, Reactions, Occurrence and Uses," VCH, New York, 1996, pp. 28-29.

International Search Report for PCT/US2011/038366, filed on May 27, 2011 with a mailing date of Feb. 21, 2012; Applicant: University of South Florida et al.

Preliminary Report on Patentability for PCT/US2011/038366, filed on May, 27, 2011 with a priority date of May 27, 2010; Applicant: University of South Florida et al.

* cited by examiner

Table 1. Blocking temperature ($T_B$), $M_r$ and $M_x$ values of the PNCs.

| Wt% of $CoFe_2O_4$ in PNCs | $T_B$ (K) | $M_r$ at 300 K (emu g$^{-1}$) | $M_x$ at 300 K (emu g$^{-1}$) | $M_r/M_2$ at 10 K |
|---|---|---|---|---|
| 100 | 298 | 38 | 45 | 0.84 |
| 80 | 298 | 27 | 32 | 0.84 |
| 50 | 298 | 17 | 20 | 0.85 |
| 30 | 298 | 9 | 11 | 0.82 |

MAGNETO-DIELECTRIC POLYMER NANOCOMPOSITES

CROSS-REFERENCE TO RELATED APPLICATIONS

This application is a continuation-in-part of and claims priority to currently pending U.S. patent application Ser. No. 14/685,031, which was filed on Apr. 13, 2015, which is a continuation-in-part of U.S. patent application Ser. No. 14/107,725, which was filed on Dec. 16, 2013 and which is a continuation of and claims priority to U.S. patent application Ser. No. 13/686,447, which was filed on Nov. 27, 2012 and which claims priority to International Patent Application No. PCT/US2011/038366, which was filed on May 27, 2011 and which claims priority to U.S. Provisional Patent Application No. 61/349,053, filed on May 27, 2010, all of which are hereby incorporated by reference into this disclosure.

STATEMENT OF GOVERNMENT INTEREST

This invention was made with Government support under Grant No. CMMI #0728073 awarded by the National Science Foundation. The Government has certain rights in the invention.

BACKGROUND

A wide variety of engineered materials have been developed that exhibit advanced magneto-dielectric properties. Such materials can significantly extend the range of microwave characteristics found in common substrates, thus improving the performance of microwave components. In particular, ferrites, ferroelectrics and multiferroics have been widely studied as functional materials with enhanced microwave properties while enabling tunable and low-loss microwave devices. In addition, polymer nanocomposites with unique absorption properties have been identified as an effective functional material for microwave electromagnetic interference (EMI) shielding. Emerging types of metamaterials show promising magneto-dielectric properties. These materials often involve the inclusion of multiple layers and/or periodic resonant arrays in order to produce tailored microwave properties, although typically within a relatively small bandwidth. Magneto-dielectrics have been shown to enable considerable improvements in the bandwidth and/or size reduction of microwave devices, such as antennas. However, the prior art implementations do not simultaneously satisfy many crucial requirements for microwave device applications, such as low dielectric and magnetic losses, low power consumption, low biasing electric or magnetic fields, structural simplicity and ease of integration with existing fabrication processes.

One of the promising ways to develop materials showing magneto-dielectric properties is to exploit polymer composites reinforced with magnetic nanoparticles. However, the dispersion of in-organic nanoparticles into a polymer matrix has been a challenging task for nanocomposite fabrication. Since the polymer matrix and inorganic nanoparticles often possess different polarities, a simple blending of particles and polymer will result in aggregation of particles and poor particle-to-polymer interfacial properties. In fabrication of magneto-dielectric materials, the key challenge is the formation of morphologically controlled and highly ordered arrays of nanoparticles over an extended area or volume.

Due to the challenges in the development of these magneto-dielectric materials, there has been very little progress in exploring their potential for tunable and/or low-loss microwave device applications. There is still a need for improvement with respect to keeping the enhanced magneto-dielectric properties in a wider frequency range, lowering fabrication complexity and reducing size and cost. As a result, extensive utilization of polymer nanocomposites has yet to occur.

Additionally, the magneto-dielectric polymer composite materials currently known in the art are solvent diluted, low-viscosity polymers that have limited applications and must be spin-coated onto the surface of a supporting substrate. The resulting thin films (approximately 2 µm) must be supported by the substrate, which prevents the magneto-dielectric polymer composite materials currently known in the art from being used in 3D printing, compression molding or injection molding application.

Accordingly, there is a need in the art for a low-loss microwave material which exhibits wide tunability of its effective dielectric and magnetic properties, which does not require a supporting substrate and can be amenable to additive manufacturing compression molding or injection molding processes.

SUMMARY OF INVENTION

The invention is a new superparamagnetic Magneto-Dielectric Polymer Nanocomposite (MDPNC), with uniformly dispersed single-domain magnetic nanoparticles that has resulted in a new class of low-loss microwave composites with very large tunability of the dielectric and magnetic properties in the form of a nanocomposite material can be freestanding or strategically designed into any geometry with well-tailored EM properties in the 3D space and does not require a supporting substrate. In a particular embodiment of the present invention, the mono-dispersion of the sub-10 nm magnetic nanoparticles with zero coercivity and zero remanence, leads to low hysteresis losses. These properties provide the potential for advanced performance in many microwave and high-speed devices, including the capability to vary the operating characteristics of the devices (e.g. the operational frequency) in real-time.

In a particular embodiment, a superparamagnetic polymer nanocomposite material is provided comprising single-domain magnetic nanoparticles coated with a surfactant and substantially uniformly dispersed in a solvent-free low-loss polymer. A special manufacturing procedure has been used to evaporate any residual solvent out of the base polymer matrix without curing it. In a particular embodiment, the magnetic nanoparticles are $Fe_3O_4$ nanoparticles having an average diameter of 8 nm. In an additional embodiment, the magnetic nanoparticles are $CoFe_2O_4$ nanoparticles having an average size of 10 nm. Other magnetic nanoparticles are within the scope of the present invention. The surfactants used in the formation of the superparamagnetic low-loss polymer nanocomposite may include oleylamine and oleic acid. Other surfactants are within the scope of the present invention. In a particular embodiment, the low-loss polymer is about 25% butadiene resin and a copolymer. Other low-loss polymers are within the scope of the present invention.

The present invention provides a method for preparing a superparamagnetic polymer nanocomposite material, which includes coating single-domain magnetic nanoparticles with surfactants, dissolving a low-loss polymer and the coated magnetic nanoparticles in a solvent, wherein the solvent has a vaporizing temperature that is much lower than the curing temperature of the low-loss polymer. The method continues by magnetically stirring the dissolved low-loss polymer and coated magnetic nanoparticles to obtain a dissolved low-loss polymer nanocomposite having substantially uniform dispersion. After the low-loss polymer and the coated nanoparticles have been dissolved in the solvent, the solvent is removed from the dissolved low-loss polymer nanocomposite by vaporizing the dissolved low-loss polymer nanocomposite in a vacuum oven at a temperature that is above the vaporizing temperature of the solvent and is below the curing temperature of the low-loss polymer. The vacuum of the vacuum oven is pulsed during the vaporizing of the dissolved low-loss polymer nanocomposite. After the solvent has been completely removed, the solvent-free low-loss polymer nanocomposite is cured at a temperature that is above the vaporizing temperature of the solvent to provide the superparamagnetic polymer nanocomposite material of the present invention. The magnetic nanoparticles may be $Fe_3O_4$ nanoparticles or $CoFe_2O_4$ nanoparticles. In addition, other magnetic nanoparticles are within the scope of the present invention. The surfactants used in the formation of the superparamagnetic low-loss polymer nanocomposite may include oleylamine and oleic acid. Other surfactants are within the scope of the present invention. In a particular embodiment, the low-loss polymer is about 25% butadiene resin and a copolymer. The solvent may be xylene or other solvent with low vaporizing temperature that is also capable to dissolving the polymer and suspending the magnetic nanoparticles. Other low-loss polymers and solvents are within the scope of the present invention.

DETAILED DESCRIPTION

Figure 1:
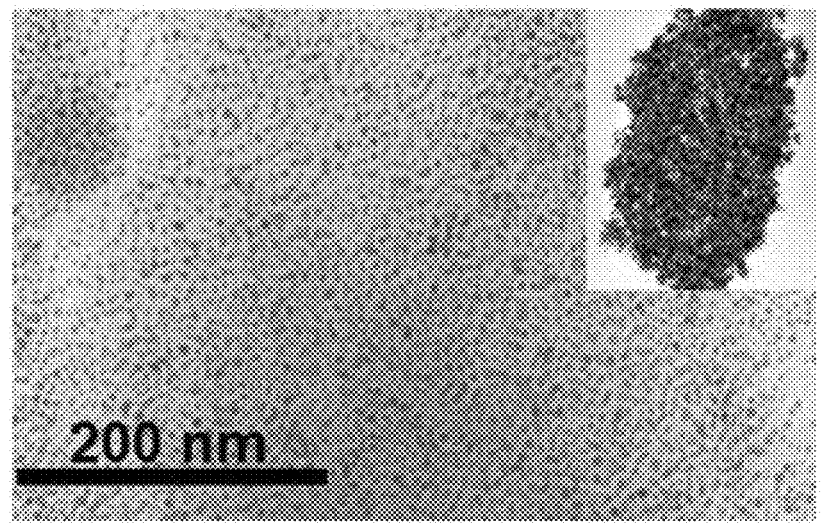
FIG. 1 illustrates a transmission electron microscopy (TEM) image of $Fe_3O_4$ nanoparticles (~8 nm mean size) uniformly dispersed in the polymer in accordance with an embodiment of the present invention. Inset on the upper right corner is an example of particle agglomeration without the usage of surfactants.

In accordance with the present invention, novel superparamagnetic magneto-dielectric polymer nanocomposites are synthesized using a novel process. The tunability of the dielectric/magnetic properties demonstrated by this novel polymer nanocomposite, when an external DC magnetic field is applied, exceeds what has been previously reported for magneto-dielectric polymer nanocomposite materials.

In a particular embodiment, $Fe_3O_4$ (magnetite) nanoparticles with mean size of approximately 8 nm and coated with surfactants (oleylamine and oleic acid) were synthesized following a standard chemical procedure. The low-loss polymer was dissolved in a solvent, such as hexane, along with various amounts of surfactant-coated nanoparticles to obtain the polymer nanocomposites with uniform dispersion of nanoparticles at the desired concentration. In order to obtain nanocomposite materials that can be free standing and unsupported by a substrate, the viscosity of the dissolved low-loss polymer must be increased. In the present invention, the solvent used in the dissolution of the polymer has a lower vaporizing temperature than the curing temperature of the low-loss polymer. Obviously, the vaporizing or decomposition temperature of the polymer is much higher than its curing temperature, which allows curing of the polymer after complete removal of the solvent by vaporization of the solvent. As such, in order to provide a highly-viscous superparamagnetic nanocomposite material the present invention removes the solvent through a combination of vaporization and vacuum pulsation, prior to the curing of the polymer nanocomposite material. In particular, the dissolved low-loss polymer is heated in a vacuum oven to a temperature that is above the vaporizing temperature of the solvent and below the curing temperature of the polymer to effectively remove the solvent from the dissolved low-loss polymer, while not simultaneously curing the polymer. Additionally, during the vaporization process, the vacuum of the vacuum oven is pulsed to improve the effectiveness of the vaporization process to avoid formation of void defects or trapped air bubbles after removal of solvent. The combination of vaporization and vacuum oven pulsation effectively eliminates the solvent prior to the curing of the polymer nanocomposite, in a subsequent step. By first removing the solvent using a temperature that is below the curing temperature of the low-loss polymer and then curing the solvent-free low-loss polymer at the curing temperature of the low-loss polymer, the air bubbles or voids that commonly form within the polymer matrix, when the solvent evaporation and polymer curing are performed substantially simultaneously, are essentially eliminated.

In general, a solvent that is capable of fully dissolving the low-loss polymer and which has a significantly lower vaporizing temperature is chosen for use in the present invention. The solvent is chosen in order to facilitate the desired particle dispersion through solution blending of the polymer and the solvent-suspended nanoparticles and to allow for the complete removal of the solvent through vacuum oven heating at a temperature that is below the curing temperature of the host polymer and pulsed vacuum routines. In a particular embodiment, the vaporizing temperature of the chosen solvent is between about 40° C. and 50° C., under vacuum, while the curing temperature of the low-loss polymer is between about 100° C. and 110° C., under vacuum. In a specific embodiment, the solvent is removed by heating the dissolved polymer nanocomposite material at 50° C. overnight and cured for approximately three hours at 110° C., while simultaneously pulsing the vacuum oven through the control of the vacuum pump approximately every 15 minutes.

The method of the preparing a superparamagnetic nanocomposite material in accordance with the present invention results in a solvent-free, highly-viscous polymer-magnetic nanoparticle composite material which can be used as a freestanding 3D or non-planar geometric structure or as a thick-film layer within a multi-layer laminate, such as a printed circuit board, or any molded 3D shape using either compression molding or injection molding processes. The viscosity of the nanocomposite materials of the present invention may be adjusted by altering the concentration of the magnetic nanoparticles incorporated into the low-loss polymer. The highly-viscous nanocomposite material of the present invention does not require a substrate, as is commonly required of thin-film spin-coated nanocomposite materials which exhibit low-viscosity. The complete removal of the solvent also allows hot compression molding of the nanocomposite materials into any designed shape without formation of the voids, residual solvent or trapped air bubbles during the curing process.

In the present invention, the significance in the approximate size of the magnetic nanoparticles dispersed in the low-loss polymer is to ensure that the size of the nanoparticles is below the single domain size of the corresponding material. For example, $CoFe_2O_4$ nanoparticles can remain as single magnetic domains if their size is kept below approximately 10 nm, while $Fe_3O_4$ nanoparticles can remain as single magnetic domains if their size is kept below approximately 20 nm.

The surfactant used to coat the nanoparticles plays a dual role in the synthesis of polymer nanocomposites. The surfactant completely encapsulates and isolates individual particles and thus weakens the magnetic exchange interactions between them. Moreover, the choice of surfactant is also important to enhance the binding between the macromolecular chains of the polymer and the individual nanoparticles; this binding prevents the particle diffusion during the formation of the polymer nanocomposite, thus effectively suppressing the tendency of agglomeration. This chemical process is important because the goal is to retain the superparamagnetic properties of both the individual magnetic nanoparticles and the entire macroscopic magneto-dielectric polymer nanocomposite (MDPNC) material, even at relatively high packing densities. Superparamagnetism or lack of coercivity, which implies no hysteresis losses, is desirable for low-loss microwave magnetic materials. Thus the polymer nanocomposites in accordance with the present invention are well-suited for implementation of numerous tunable and low-loss RF and microwave devices.

FIG. 1 presents a typical transmission electron microscopy (TEM) image of the chemically synthesized, surfactant coated $Fe_3O_4$ nanoparticles dispersed in the polymer and coated as 20 µm-thick films on glass substrates or microwave calibration boards. As seen in this figure, excellent dispersion is achieved and nanoparticles do not form clusters. The inset on the upper right corner of the same figure shows a classic example of agglomeration if the proper chemical processing with surfactants is not done during the polymer film coating.

Figure 2:
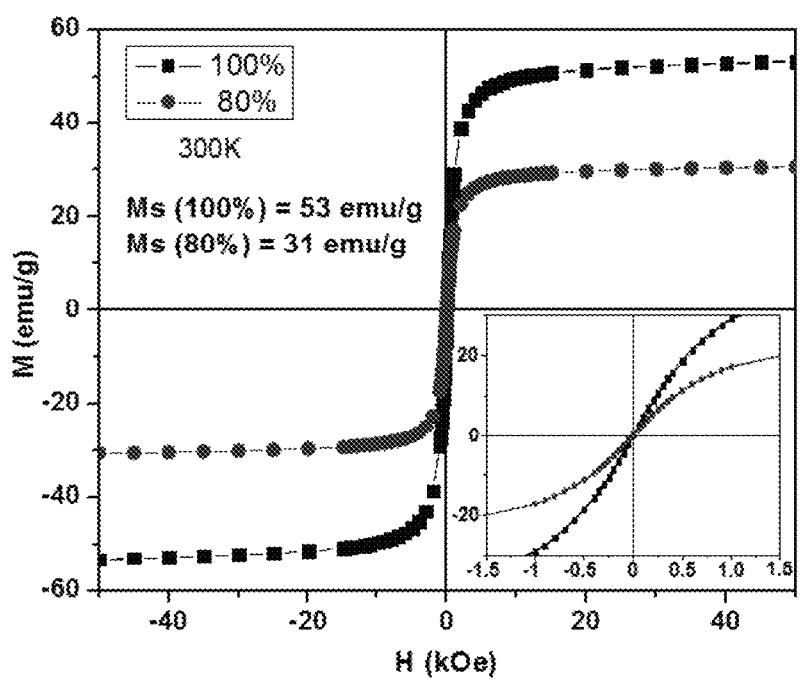
FIG. 2 illustrates M(H) curves for as-synthesized magnetite ($Fe_3O_4$) nanoparticles and the MDPNC (at 80% w/w) in accordance with an embodiment of the present invention. Inset on the right side shows the expanded view of the low field region clearly indicating lack of coercivity or remanence in the materials.

In order to verify that the superparamagnetic response retained in the MDPNC, due to the homogenously dispersed ferromagnetic nanoparticles in the polymer matrix, magnetization measurements were done by Physical Property Measurement System (PPMS). FIG. 2 presents measured M(H) loops for the $Fe_3O_4$ nanoparticles and the MDPNC at 80% w/w. The data show excellent saturation magnetization characteristics and zero coercivity, as well as zero remanence at room temperature, which are the characteristic signatures of superparamagnetism.

To evaluate the tunability of the MDPNC in accordance with the present invention, a multi-layer microstrip linear resonator (MLR) filled with polymer nanocomposites was designed to study the variation of the MDPNC's microwave properties. The resonance frequency of the microstrip resonator depends on the effective material properties of the substrate given by:

$$f_r = \frac{v_p}{\lambda_g} = \frac{c}{\lambda_g \sqrt{\varepsilon_{eff} \times \mu_{eff}}} \quad (1)$$

and $$\lambda_g = \frac{2l_r}{n} \quad (2)$$

where $l_r$ is the length of the center conductor in the MLR and n represents the $n^{th}$ resonant frequency of the MLR. The characteristic impedance of the microstrip feed lines was designed to be 50Ω.

Figure 3:
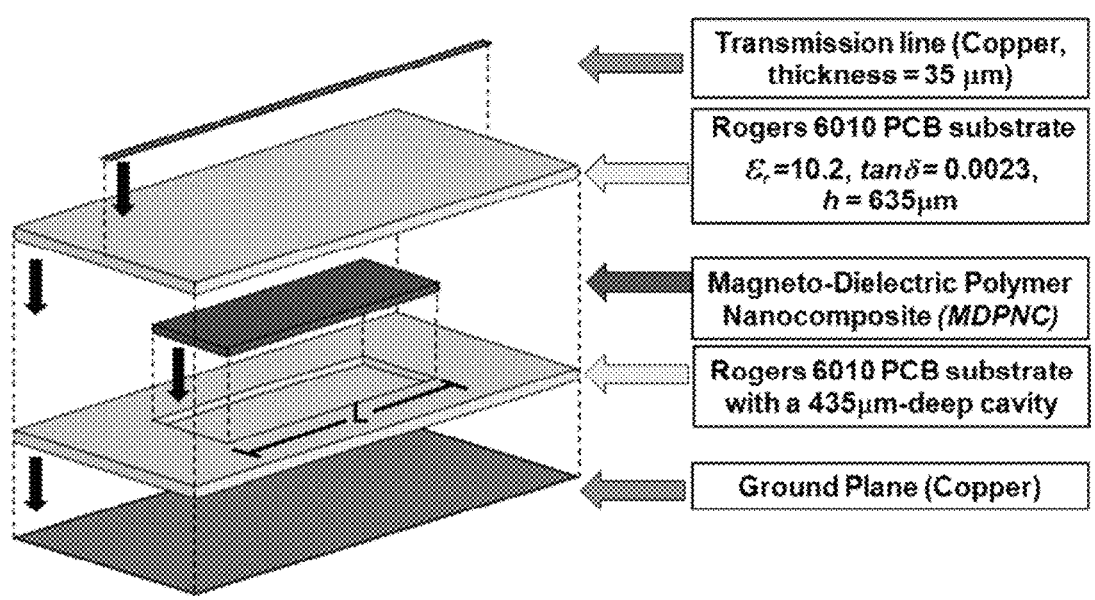
FIG. 3 illustrates the 3-dimensional architecture of the multi-layer microstrip structure for extraction of the microwave properties of MDPNCs.

The MLR test fixture is formed by bonding two printed circuit board (PCB) laminates together. The RF PCB laminate chosen was a thermoset low-loss polymer composite ($\varepsilon_r$=10.2, tan δ=0.0023) with a thickness of 635 μm, which offers a high dielectric constant and thus good contrast with the MDPNC material. The MDPNC is deposited in the 435 μm cavity (bottom laminate), and heated in a vacuum oven at 90° C. for 4 hours to harden (cure) the composite materials. FIG. 3 presents the 3-dimensional architecture of the test structure.

Two-port S-parameters measurements were performed and concurrently, an external magnetic field in the range from 0 to 4 kOe is applied to the MLR. The orientation of the magnetic field lies perpendicular to the direction of signal propagation. The base material was composed of ferromagnetic nanowires under magnetic fields up to 9 kOe to modulate the response of such device. In the case of the MDPNC in accordance with the present invention, a maximum magnetic field of 4 kOe was needed to obtain the peak performance due to the superparamagnetic nature of the material. This field can be easily obtained using small and low-cost commercial Neodymium magnets.

Figure 4:
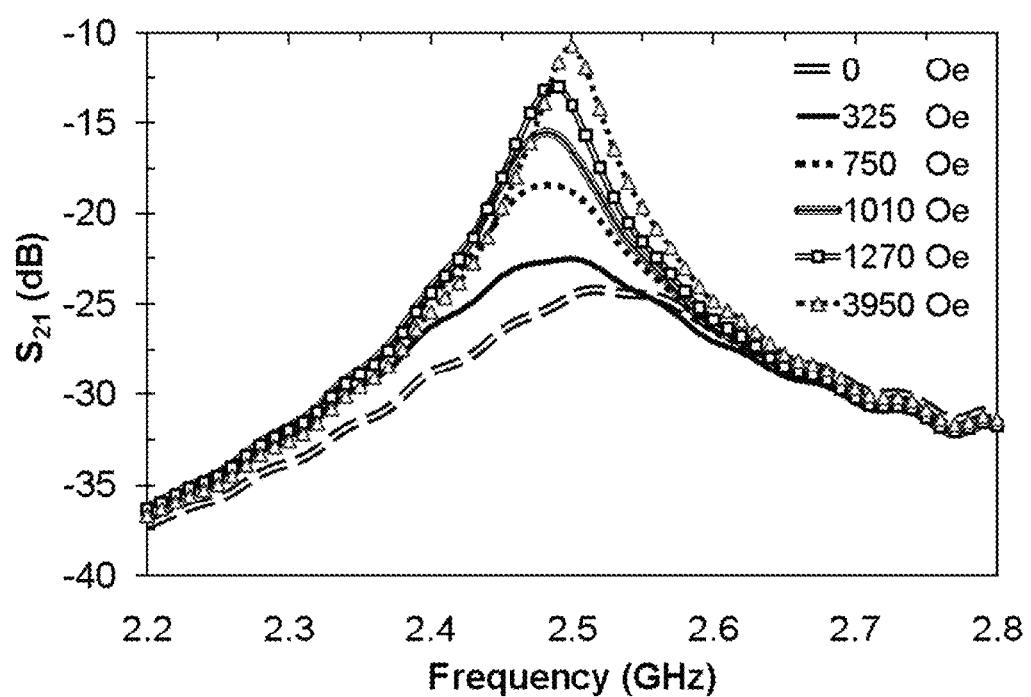
FIG. 4 illustrates the measured transmission parameter of the microstrip linear resonator (MLR) with MDPNC prepared in accordance with the present invention. Loaded Q-factor, transmitted power and resonance frequency are dependent of the applied magnetic biasing field.

FIG. 4 presents the measured transmission characteristic $S_{21}$ of the MLR versus applied DC magnetic field. As shown, a resonance frequency of 2.537 GHz along with an insertion loss of 24.2 dB and a measured loaded Q of 13 is observed in the absence of the magnetic field. As the strength of externally applied DC magnetic field is increased, change in the resonance frequency is measured. Concurrently, the insertion loss decreases and the Q of the resonator increases. The MDPNC exhibits a different behavior compared with other traditional ferrite materials used for microwave applications. In the prior art, as the strength of the applied DC magnetic field increases, the insertion loss increases along with a drop of the Q factor.

Figure 5:
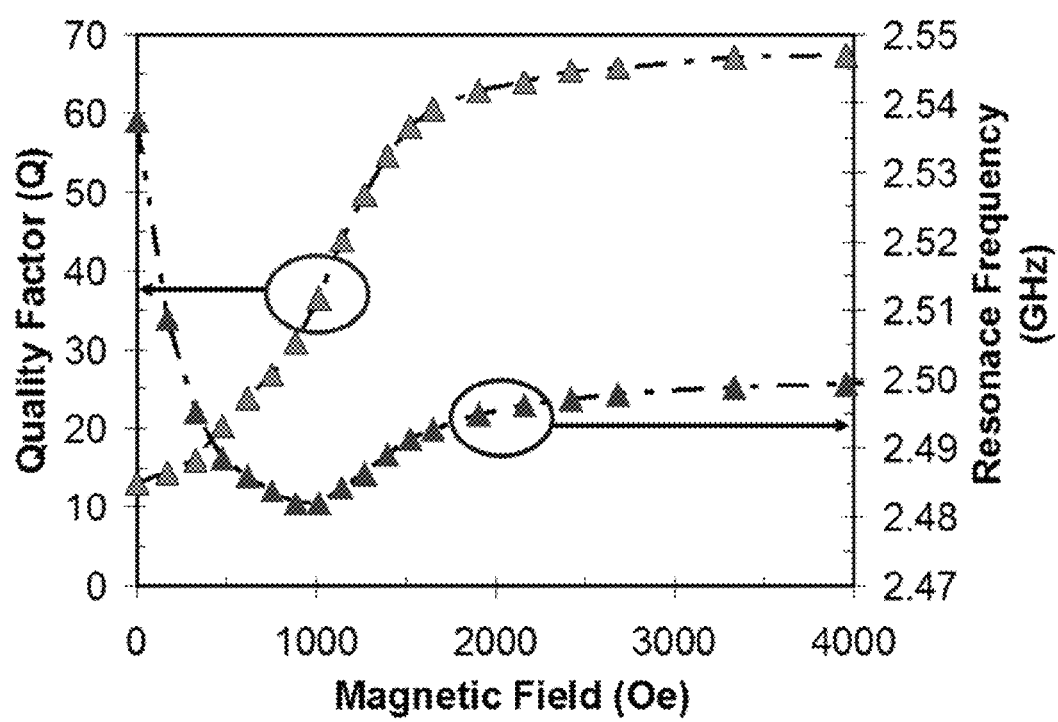
FIG. 5 Measured Q-factor and resonant frequency vs. DC magnetic field strength. Q-factor, transmitted power and resonance frequency are dependent of the applied magnetic biasing field.
Figure 6:
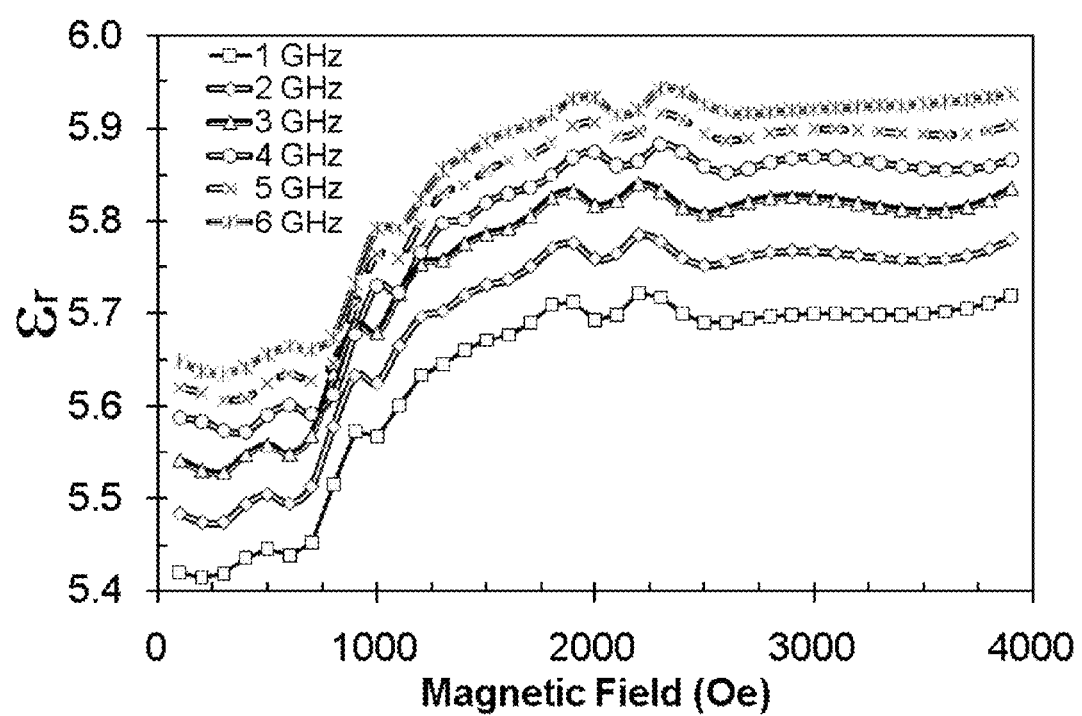
FIG. 6 illustrates the extracted magnitude of $\in_r$, for $Fe_3O_4$ polymer nanocomposite (at 80% w/w) in accordance with the present invention.
Figure 7:
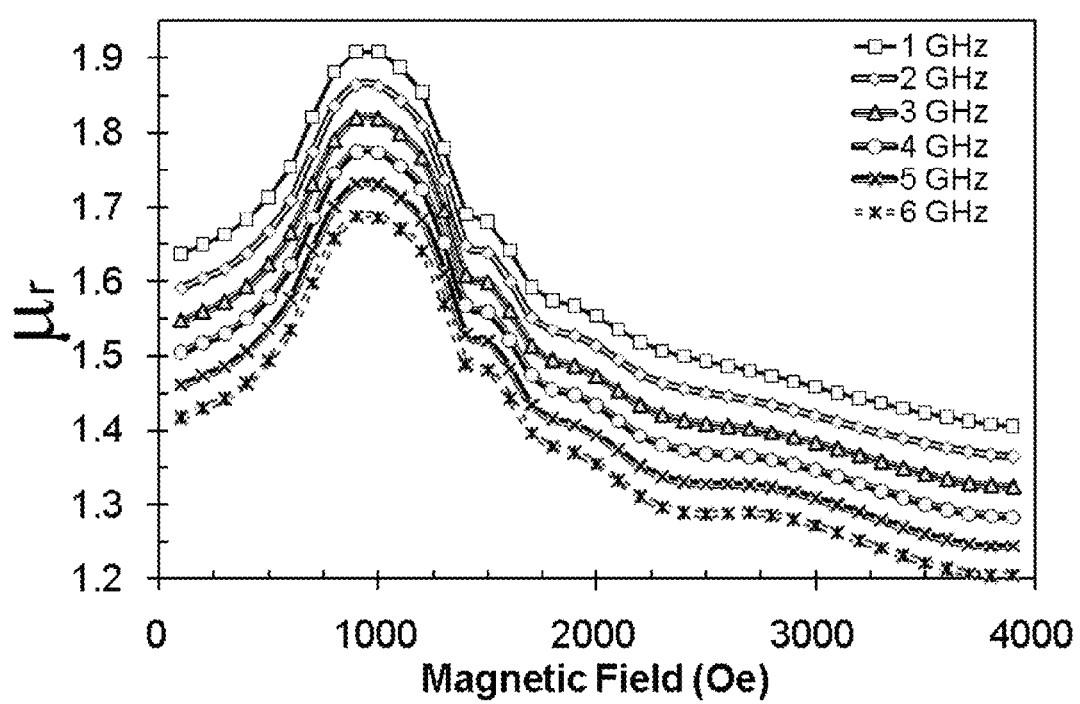
FIG. 7 illustrates the extracted magnitude of $\mu_r$, for $Fe_3O_4$ polymer nanocomposites (at 80% w/w) in accordance with the present invention.

The influence of the DC magnetic field on the resonance frequency of the device is shown in FIG. 5. A deviation of 57 MHz in the resonance frequency was observed (from 2.537 GHz to 2.480 GHz) as the field varied from 0 to 4 kOe. Also, under an external field of 4 kOe, the maximum loaded Q factor of 67 is demonstrated along with the lowest insertion loss of 10.5 dB.

A non-resonant multi-layer microstrip transmission line was employed to extract the microwave properties of the MDPNC (e.g. $\varepsilon_r$, $\mu_r$ and tan δ). The structure of this device is similar to the multi-layer MRL. The key difference is that the through transmission line between the two ports is uninterrupted.

Microwave properties of the material were extracted using an improved technique derived from the Nicolson-Ross-Weir method, and a conformal mapping method was used to extract analytical relations for the filling factor of the multi-layer structure.

$\varepsilon_r$, $\mu_r$ and tan δ were extracted from 0.65 to 6 GHz at room temperature conditions (300 K) and plotted vs. the applied magnetic biasing field. FIG. 6, FIG. 7 and FIG. 8A and FIG. 8B present the extracted values for $\varepsilon_r$, $\mu_r$ and tan δ of the synthesized magneto-dielectric polymer nanocomposites with 80% by weight of 8 nm magnetite ($Fe_3O_4$) nanoparticles. Note that $\varepsilon_r$ and $\mu_r$ reach saturation points at 2 and 4 kOe, respectively. In addition, $\mu_r$ shows ferromagnetic resonance (FMR) characteristic associated with the presence of ($Fe_3O_4$) in the MDPNC.

Figure 8A:
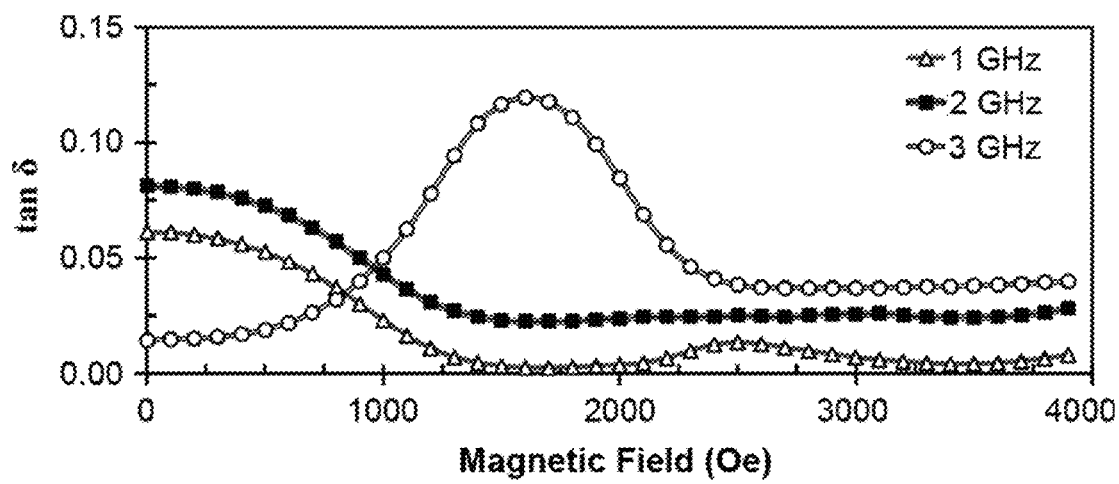
FIG. 8A illustrates the extracted tan δ, for $Fe_3O_4$ polymer nanocomposites (at 80% w/w) at frequencies of 1 GHz, 2 GHz and 3 GHz, in accordance with the present invention.
Figure 8B:
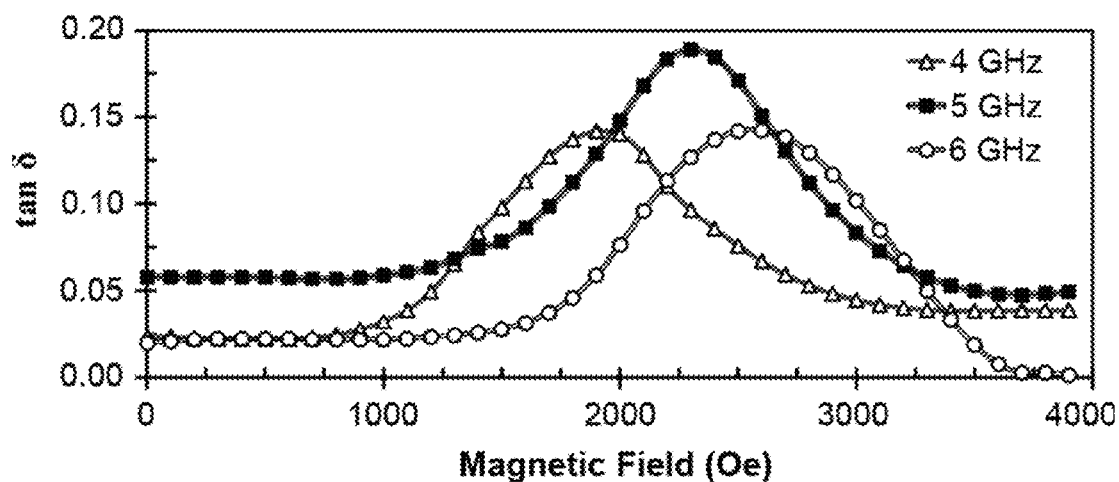
FIG. 8B illustrates the extracted tan δ, for $Fe_3O_4$ polymer nanocomposites (at 80% w/w) at frequencies of 4 GHz, 5 GHz and 6 GHz, in accordance with the present invention.

As shown in FIG. 8A and FIG. 8B, the response of the tan δ has a maximum and a minimum of 0.2010 and 0.0011, respectively. This clearly indicates that losses in the material have large susceptibility to external applied magnetic fields.

The accuracy of the parameters extraction procedure has been validated by comparison of the calculated attenuation obtained from the extracted material properties, and the attenuation calculated from the S-parameter measurements. From the extracted parameters:

$$\tan\delta = \frac{\delta_r''}{\delta_r'} \quad (3)$$

where $$\delta_r' = \mu_r' \varepsilon_r' - \mu_r'' \varepsilon_r'' \quad (4)$$

and $$\delta_r'' = \mu_r' \varepsilon_r'' - \mu_r'' \varepsilon_r' \quad (5)$$

The calculated attenuation from the extracted parameters is expressed as:

$$\alpha = \frac{\pi\sqrt{2\delta_r'}}{\lambda_0}\left[\sqrt{1+\tan^2\delta} - 1\right]^{1/2} \quad (6)$$

On the other hand, the measured attenuation is calculated from the S-parameters:

$$e^{-(\alpha+j\beta)} = \left\{\frac{1-S_{11}^2+S_{21}^2}{2S_{21}} \pm K\right\}^{-1} \quad (7)$$

where $$K = \left\{\frac{(S_{11}^2 - S_{21}^2 + 1)^2 - (2S_{11})^2}{(2S_{21})^2}\right\}^{1/2} \quad (8)$$

Figure 9A:
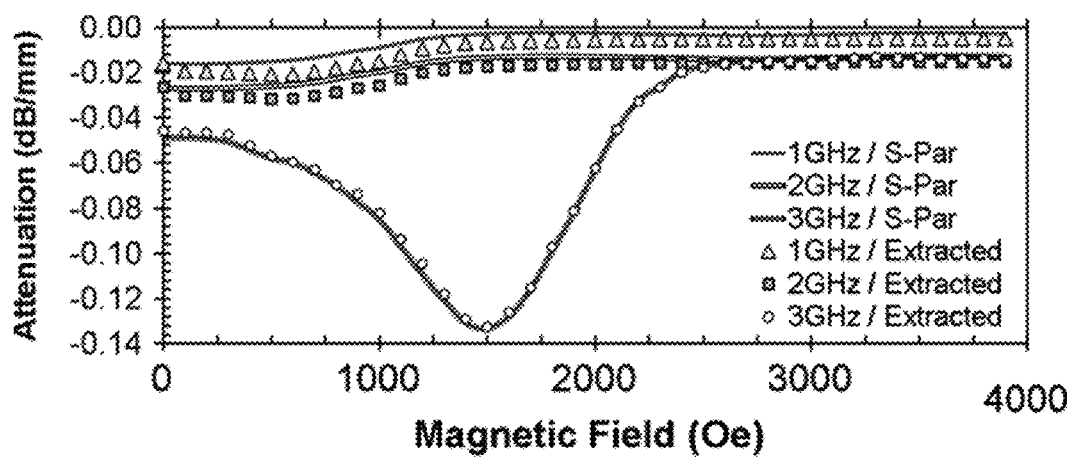
FIG. 9A illustrates a comparison of the attenuation calculated directly from S-parameters and that calculated using the extracted parameters at frequencies of 1 GHz, 2 GHz and 3 GHz, in accordance with the present invention.
Figure 9B:
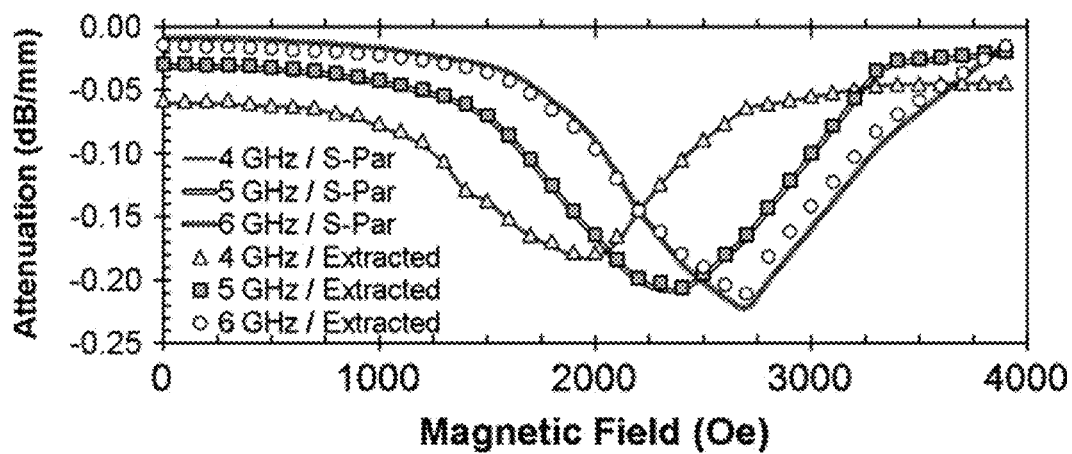
FIG. 9B illustrates a comparison of the attenuation calculated directly from S-parameters and that calculated using the extracted parameters at frequencies of 4 GHz, 5 GHz and 6 GHz, in accordance with the present invention.

FIG. 9A and FIG. 9B present the comparison of the attenuation calculated directly from the S-parameters and the calculated using the extracted parameters.

The present invention illustrates that magneto-dielectric polymer nanocomposites with approximately 8 nm $Fe_3O_4$ nanoparticles have great potential to be implemented in the fabrication of low-loss and tunable microwave substrates and devices. An important novelty of such material resides in its superparamagnetic properties that guarantee low-loss at microwave frequencies. Implementing a MLR as the carrier of the MDPNC, measured frequency tunability of 57 MHz, and marked enhancement of the quality factor from 13 to 67 (5.1× improvement) were achieved with an externally applied DC magnetic field of less than 4 kOe. The observed variations in the resonance frequency, insertion loss and quality factor of the fabricated device clearly indicate the large sensitivity of the device to magnetic bias fields. Undoubtedly, this nanocomposite material shows fascinating properties that has never been reported and will be applicable in improved microwave device applications.

In an additional embodiment, $CoFe_2O_4$ (CFO), which is a well-known hard magnetic material in its bulk form with large coercivity, exchange bias and high saturation magnetization, is used in the fabrication of magneto-dielectric polymer nanocomposite in accordance with present invention.

In a particular embodiment of the present invention the high temperature synthesis for $CoFe_2O_4$ nanoparticles (NPs) includes taking 2 mmol of a mixture of cobalt (II) acetylacetonate and iron (III) acetylacetonate in 1:2 ratio by weight. Then the mixture was added to 10 mmol 1,2, hexadecanediol, 6 mmol oleic acid, 6 mmol oleylamine, and 20 mL benzyl ether. The mixture was heated to 200° C. for 2 h with constant stirring and then reflexed at 300° C. for 1 hour in the presence of Ar gas. The reaction mixture was allowed to cool to room temperature and ethanol was added to the cooled mixture. The black precipitate was separated by centrifugation. The final product, $CoFe_2O_4$ NPs, was dispersed in hexane. The resulting NPs were 10±1 nm in size, on average, and had no obvious indication of agglomeration over several regions of the samples observed, as verified by transmission electro microscope (TEM) images.

The polymer nanoparticle composites (PNCs), consisting of a thermoset low-loss polymer composite polymer and CFO, were prepared by adding a calculated amount of CFO to the polymer by weight to get the desired compositions. Nanocomposites with 30, 50 and 80% wt of CFO in the thermoset low-loss polymer composite were prepared. Both the polymer and the NPs were dissolved in hexane and magnetically stirred overnight to obtain uniform dispersion.

Following the uniform dispersion of the polymer and NPs in hexane, the dissolved nanocomposite polymer was heated to the vaporization temperature of hexane, but below the curing temperature of the polymer, and simultaneously vacuum pulsed in a vacuum oven to remove the solvent from the dissolved nanocomposite polymer to establish the superparamagnetic low-loss polymer nanocomposite material.

Figure 10A:
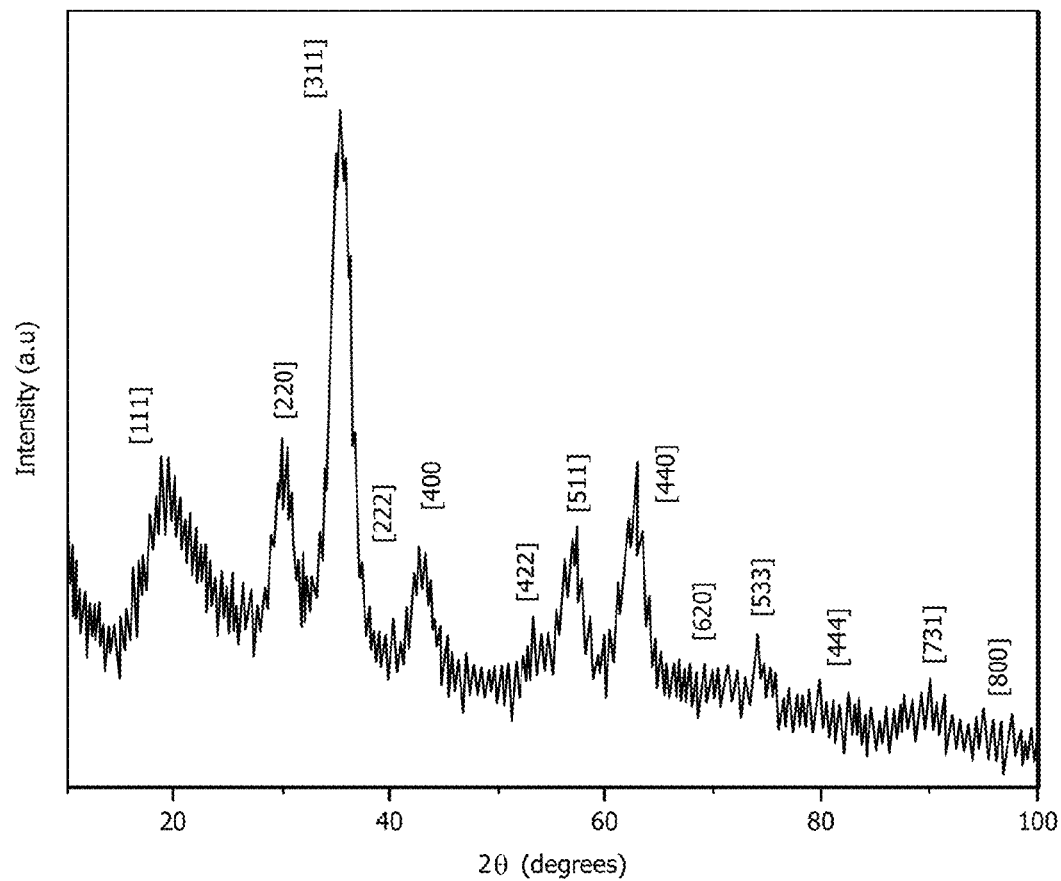
FIG. 10A illustrates an XRD pattern of 10 nm $CoFe_2O_4$, in accordance with an embodiment of the present invention.
Figure 10B:
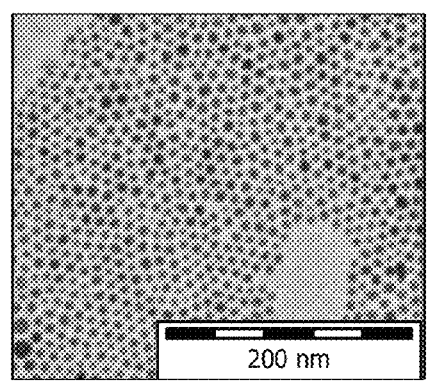
FIG. 10B illustrates a TEM image of 10 nm $CoFe_2O_4$ nanoparticles (NPs), in accordance with an embodiment of the present invention.
Figure 11A:
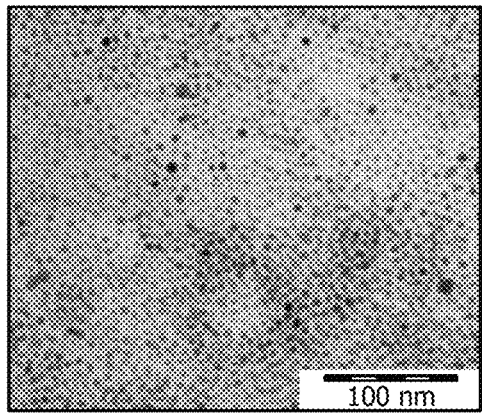
FIG. 11A illustrates 30 wt % $CoFe_2O_4$-thermoset low-loss polymer composite, in accordance with an embodiment of the present invention.
Figure 11B:
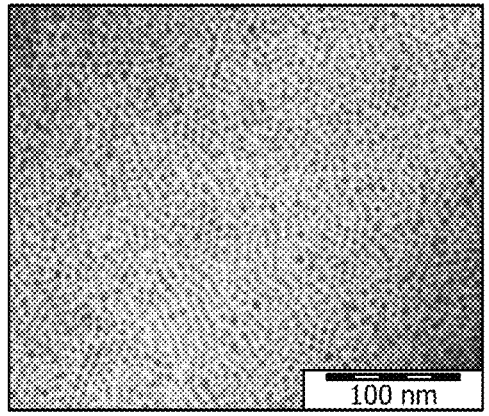
FIG. 11B illustrates 50 wt % $CoFe_2O_4$-thermoset low-loss polymer composite, in accordance with an embodiment of the present invention.
Figure 11C:
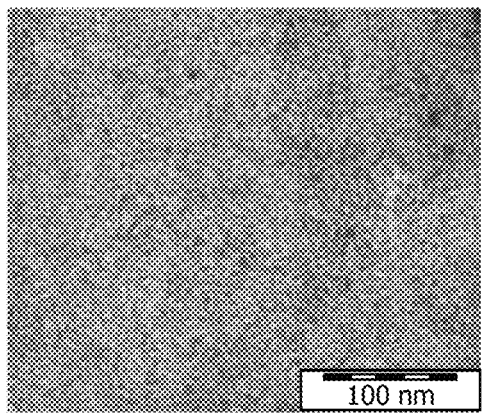
FIG. 11C illustrates 80 wt % $CoFe_2O_4$-thermoset low-loss polymer composite, in accordance with an embodiment of the present invention.
Figure 11D:
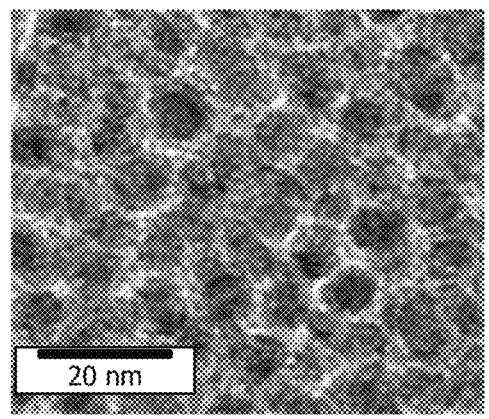
FIG. 11D illustrates a high resolution TEM micrograph of 50 wt % $CoFe_2O_4$-thermoset low-loss polymer composite, in accordance with an embodiment of the present invention.

To test the $CoFe_2O_4$ polymer nanocomposite, the microstrip test fixture previously described was utilized. The x-ray diffraction (XRD) patter of CFO NPs is shown with reference to FIG. 10A. All the peaks in the pattern correspond to the expected inverse cubic spinel structure of $CoFe_2O_4$. FIG. 10B shows the transmission electron microscopy (TEM) image of CFO NPs. As shown, the particles are nearly spherical in shape, with mean particle size 10±1 nm in diameter, and are well-separated from each other.

To examine the dispersion of CFONPs in the polymer matrix, TEM images of the PNCs were taken TEM images of 30, 50 and 80% wt PNCs are depicted in FIG. 11A-FIG. 11D. From FIG. 11A-FIG. 11D it is clearly seen that the particles are evenly dispersed throughout the polymer matrix with no discrete cluster formation even at the highest particle loading (80 wt % CFO) composite. A closer view of the 50 wt % composite (FIG. 11D) using high resolution TEM reveals the clear boundaries between particles and the polymer matrix.

Figure 12:
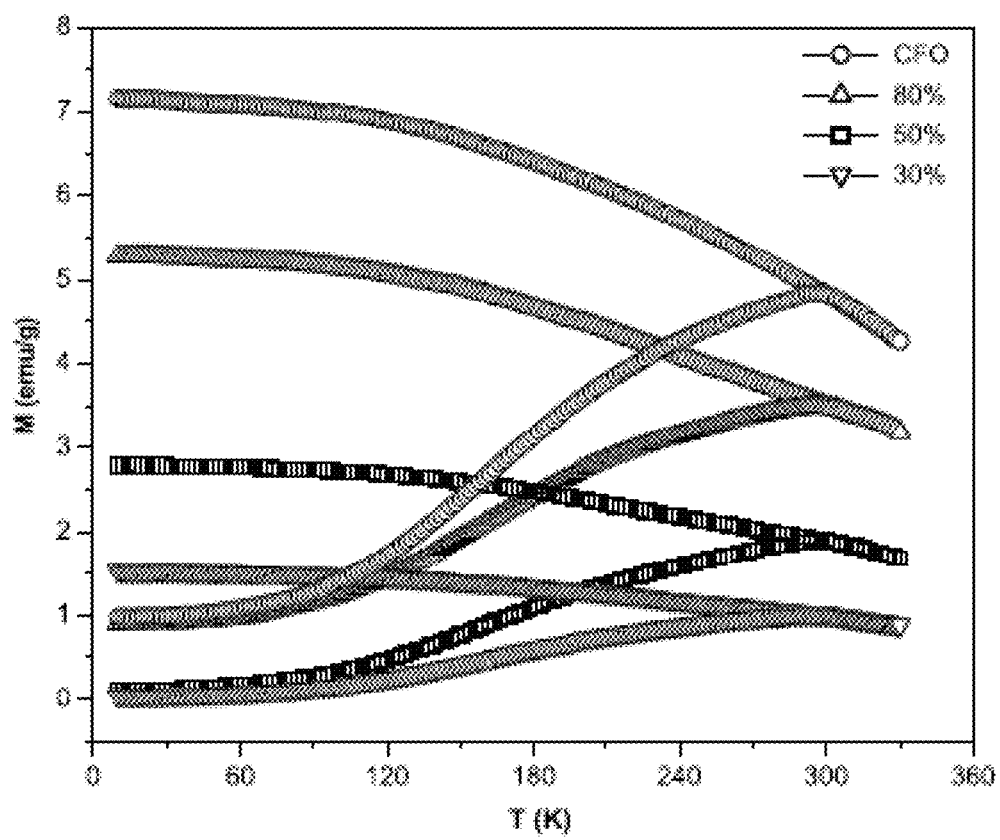
FIG. 12 illustrates M(T) plot of 30 wt %, 50 wt %, 80 wt % $CoFe_2O_4$-thermoset low-loss polymer composite nanocomposites and pure $CoFe_2O_4$ NPs.

The magnetization (M) measurements were done in the temperature (I) range from 330 degrees K down to 10 degrees K and magnetic fields (H) up to 50 kOe using a commercial Physical Properties Measurement System (PPMS). The DC magnetic characterizations were done using field cooled-zero field cooled (FC-ZFC) mode M(T) and M(H) hysteresis loop measurements in ZFC mode. For this purpose, the samples were loaded in a standard gelatin capsule. FIG. 12 shows the temperature dependence of the field cooled (FC) and zero field (ZFC) magnetization of the four different samples of PNCs measured under the applied field of 100 Oe. For all samples the ZFC curve shows a maximum temperature corresponding to the blocking temperature ($T_B$) of the NPs, above which the particles are superparamagnetic, and decreases rapidly at lower temperatures, while the FC curve increases as temperature decreases in the temperature ranged of 330-10 degrees K. The observed magnetization is characteristic of single domain nanoparticles. The blocking temperature of a single domain particle can be described by the relation:

$$T_B = \frac{KV}{25k_B} \tag{9}$$

where K is the magnetocrystalline anisotropy, V is the volume of the nanoparticle and $k_B$ is the Boltzmann constant. It can be observed from FIG. 12 that $T_B$ is 298 degrees K for CFO and it remains the same for all of the thermoset low-loss polymer-CFO composites. The advantage of using these CFO NPs is that their blocking temperature ($T_B$=298 degrees K) is around room temperature and thus the superparamagnetic and blocked states could both be effectively used for different applications that require soft magnetic or hard magnetic properties of the dispersed nanoparticles in the PNCs. This may provide interesting results for microwave transmission through waveguides coated with such PNCs. The peak width of the ZFC curve is related to the relaxation time distribution and correspondingly the particle volume distribution, as shown in equation. From the M(T) graphs, it is clear that the peak width of the ZFC curve for all of the composites looks similar, indicating that the effective particle size distribution is not affected by the loading concentrations, which is consistent with the TEM results.

In the present invention, $T_B$ remains nearly constant for all PNCs, with the value being exactly same as CFO NPs, which indicates that the interparticle interactions are less prominent here because of a homogeneous dispersion of particles with average size of 10±1 nm in the polymer matrix, as shown in TEM. It also indicates that the surfactant coating of the particles is robust and preserved during the PNC formation. This observation is very important for tumble microwave applications as problems with particle dispersion are known to affect the response and often yield results that are not reproducible from sample to sample.

Figure 13A:
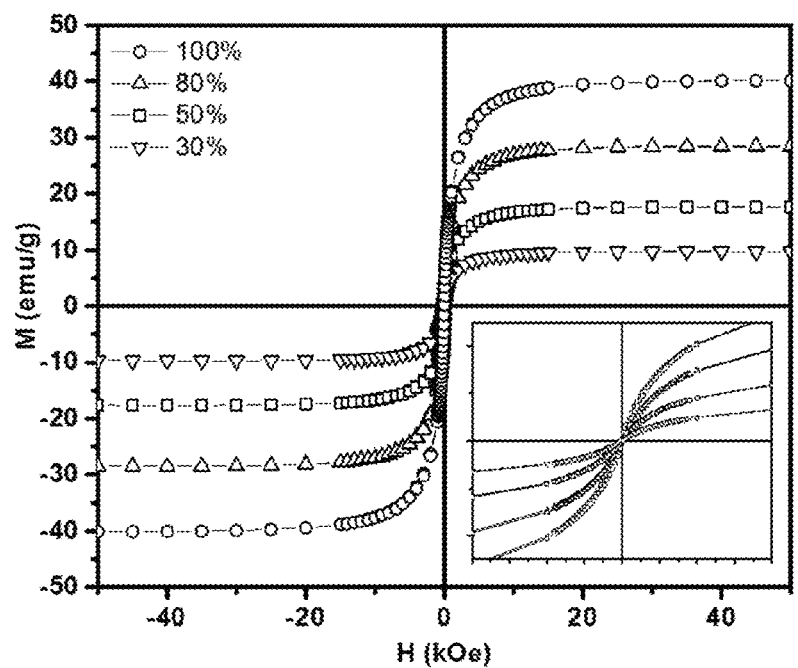
FIG. 13A illustrates M(H) plots of 30 wt %, 50 wt %, 80 wt % $CoFe_2O_4$-thermoset low-loss polymer composite nanocomposites and pure $CoFe_2O_4$ NPs at 300 K, in accordance with an embodiment of the present invention.
Figure 13B:
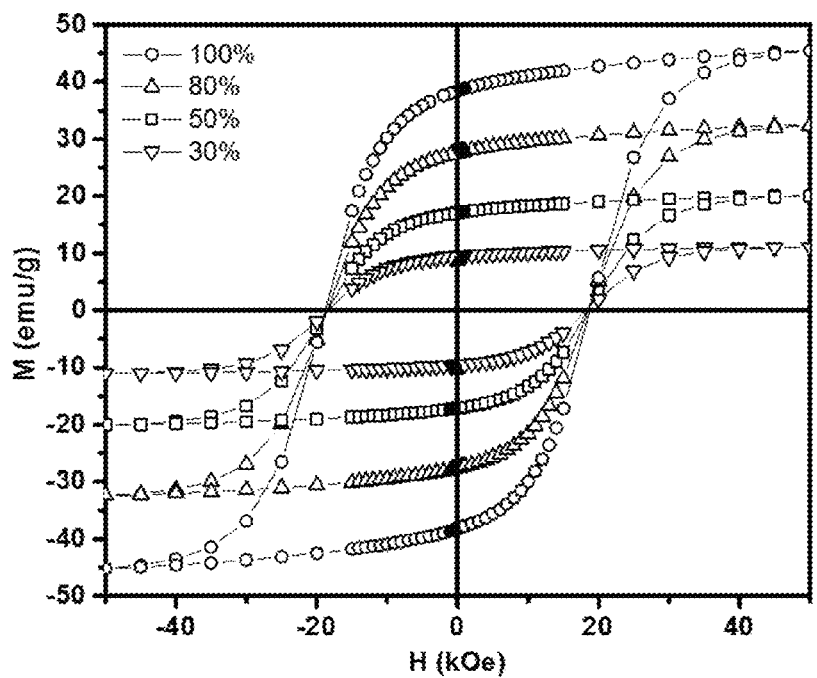
FIG. 13B illustrates M(H) plots of 30 wt %, 50 wt %, 80 wt % $CoFe_2O_4$-thermoset low-loss polymer composite nanocomposites and pure $CoFe_2O_4$ NPs at 10 K, in accordance with an embodiment of the present invention.

In order to investigate the superparamagnetic nature and magnetization profile of the PNCs, M(H) data have been measured at 300 degrees K and 10 degrees K. FIG. 13 shows the dependence of the magnetization on the magnetic field in the range of ±50 kOe at 300 degrees K and at 10 degrees K. The M(H) curves at 300 degrees K show no hysteresis (FIG. 13A inset), which is consistent with superparamagnetic behavior, whereas M(H) curves at 10 degrees K have a hysteresis loop (FIG. 13B) with high coercivity ($H_c$=19 kOe).

Figures 14, 15:
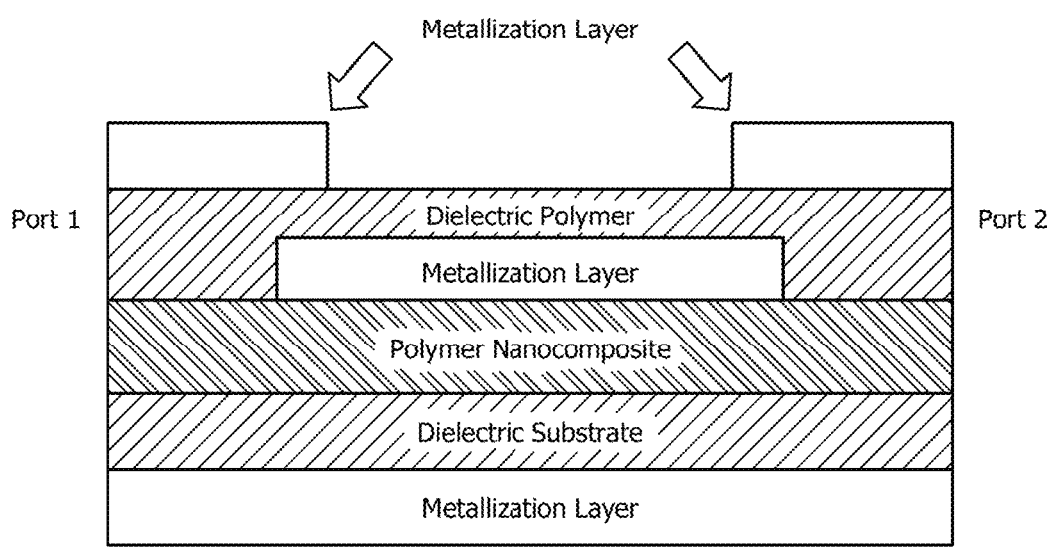
FIG. 14 is a table illustrating blocking temperatures.
FIG. 15 is a cross-sectional diagram illustrating the multilayer microstrip linear resonator.

The saturation magnetization ($M_s$) increases with increasing particle loading in the composites, as shown in the table of FIG. 14, which is to be expected with the increase in magnetic volume. It is worth mentioning here that the coercivity of each sample ($H_c$=19 kOe) at 10 degrees K does not change on increasing the percentage loading of the CFO in the system. In the present invention, it has been seen that upon increasing the particle density from 30 to 80 wt % in PNCs, neither $T_B$ nor $H_c$ change, which is extremely important for tumble device fabrication. The reduced remanence ($M_r/M_s$) from the hysteresis loop at 10 degrees K has been determined for all the samples (Table of FIG. 14). It is seen that this value also does not alter with CFO loading in the samples. It is reported that the reduced remanence can be a measure of inter-particle interactions in single domain particles. The experimental results ($M_r/M_s$~0.8) are again consistent with a weak inter-particle interaction being present in these PNCs that does not vary with CFO loading concentration.

To test the microwave response of these PNCs, a two-port microstrip linear resonator was designed using the multilayer structure shown schematically in FIG. 15. The resultant frequency of the resonator relies on the effective material properties of the substrate used, following the relation:

$$F_{rec} \propto \frac{1}{\sqrt{\mu \varepsilon}} \qquad (10)$$

in which $\mu_r$ and $\in_r$ are the effective permeability and electric permittivity, respectively, for the multilayer system.

Figure 16:
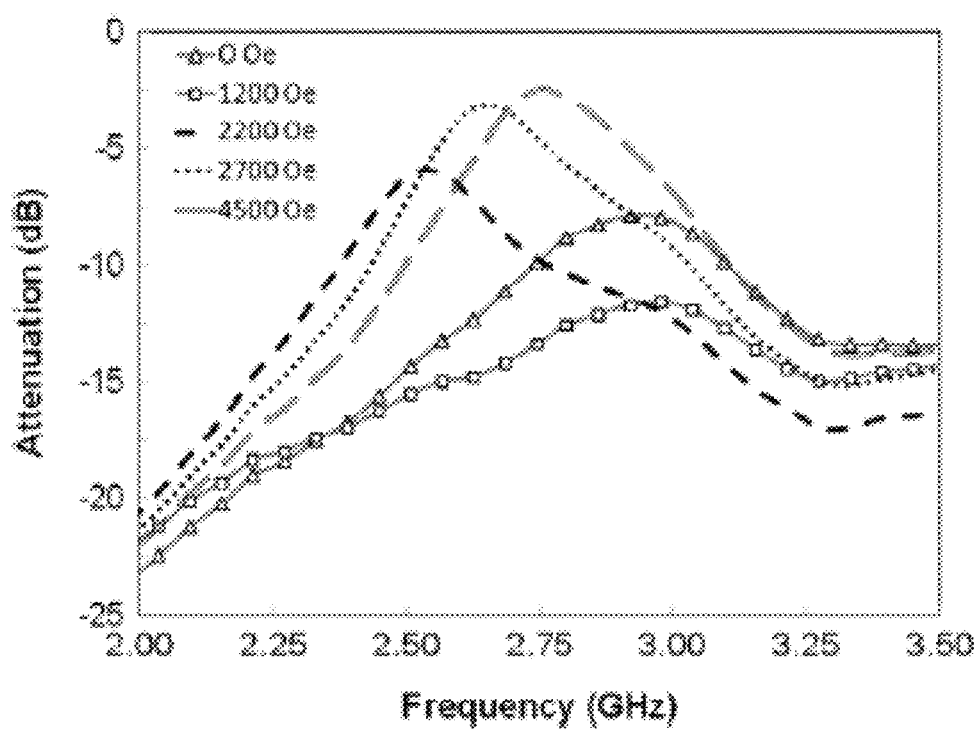
FIG. 16 illustrates the measured transmission characteristics of the microstrip linear resonator with embedded cobalt ferrite nanocomposite with 80 wt % loading. The transmitted power and resonance frequency show a strong dependence on the strength of the applied DC magnetic field.

FIG. 16 presents the measured transmission characteristics of the aforementioned resonator with embedded CFO PNCs versus applied DC magnetic field for the sample with 80% loading. The observed variations in the resonance frequency are due to the changes in the permeability and electric permittivity of the PNC. The changes in the magnitude of the transmission characteristics and quality factor of the device are also partially related to the variation in the effective losses of the nanocomposite material.

Figure 17A:
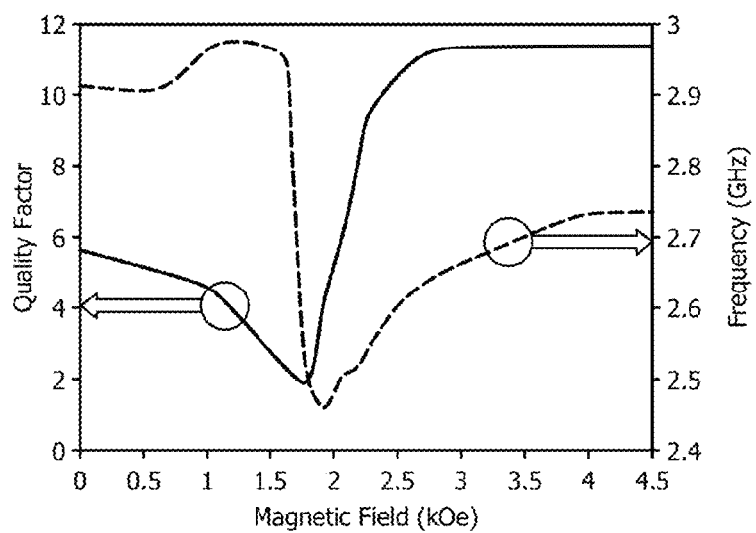
FIG. 17A illustrates the measured quality factor and resonant frequency versus DC magnetic field strength for microstrip resonator devices with 80 wt % loading, in accordance with an embodiment of the present invention.
Figure 17B:
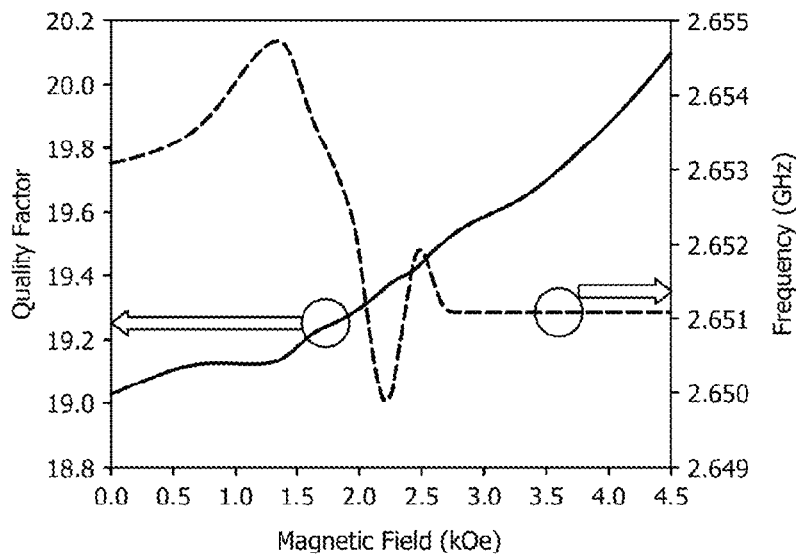
FIG. 17B illustrates the measured quality factor and resonant frequency versus DC magnetic field strength for microstrip resonator devices with 50 wt % loading in accordance with an embodiment of the present invention.
Figure 17C:
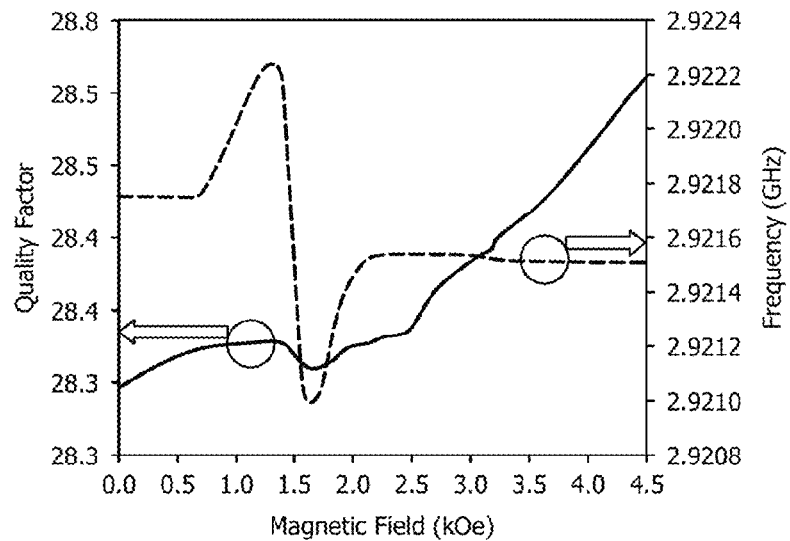
FIG. 17C illustrates the measured quality factor and resonant frequency versus DC magnetic field strength for microstrip resonator devices with 30 wt % loading of $CoFe_2O_4$ NPs, in accordance with an embodiment of the present invention.

The influences of the DC magnetic field on the resonance frequency and quality factor of the microstrip linear resonators with 80 wt %, 50 wt % and 30 wt % loadings of PNC are shown in FIGS. 17A, 17B and 17C, respectively. For the device with 80 wt % loading of CFO, a strong deviation of 518 MHz (from 2.976 to 2.458 GHz) in the resonance frequency was observed, which implies that the product of $\mu_r$ and $\in_r$ experienced a significant variation under the application of an external magnetic field. Furthermore, the quality factor was increased by 5.6× from 2.0 to 11.46 along with the lowest insertion loss of 2.67 dB under an external field of less than 4.5 kOe. It is important to note that the extracted Q-factor for the resonator with the highest CFO loading (80 wt %) is greatly enhanced with increasing magnetic field. Evidently, the incorporation of a high concentration of magnetic nanoparticles into a polymer matrix improves the tunability of the complex electric permittivity and complex permeability at microwave frequencies.

However, as compared with the 80 wt % sample of PNC, the other samples with reduced loading of 50 and 30 wt % only demonstrate subtle changes in their measured frequency responses under the influence of the externally applied DC magnetic field, as shown in FIG. 17B and FIG. 17C. In particular, a frequency deviation of 5 MHz and much smaller change in Q-factor, from 19.03 to 20.1, were observed for 50 wt % loading while a frequency deviation of 1.25 MHz and a change in Q-factor, from 28.3 to 28.51, were observed for 30 wt % loading. Clearly, PNCs with lower concentrations of magnetic nanoparticles lead to a less tunable material. With respect to the tunability of the CFO nanocomposite material, it is obvious that a fairly high loading beyond 50 wt % would be preferred. However, as the incorporation of the magnetic nanoparticles also introduces noticeably extra losses, a design strategy and trade off might be needed to achieve the best balance between the desired tunability and the microwave performance of the devices.

The low-loss microwave nanocomposite material in accordance with the present invention can be differentiated from other nanocomposite films by measuring and comparing the full dielectric electric permittivity ($\in'+j\in''$) and the magnetic electric permittivity ($\mu'+j\mu''$) of the prior art nanocomposite film with the fill dielectric electric permittivity and magnetic electric permittivity of the low-loss microwave nanocomposite material of the present invention.

Both the full dielectric electric permittivity ($\in'+j\in''$) and the magnetic electric permittivity ($\mu'+j\mu''$) properties of a material have a real part, which is the relative electric permittivity $\in'$ and relative permeability $\mu'$, and an imaginary part, which is the dielectric loss $\in''$ and the magnetic loss $\mu''$. The ratio between the imaginary part and the real part of the dielectric electric permittivity and magnetic electric permittivity are defined as the corresponding loss tangents:

Dielectric loss tangent tan $\delta_d = \in''/\in'$

Magnetic loss tangent tan $\delta_m = \mu''/\mu'$

The dielectric loss tangent $\delta_d$ and the magnetic loss tangent $\delta_m$ are commonly used by radio frequency engineers to test and verify whether or not a particular material is considered be a lossy material or a low-loss material.

In general, in the low-loss polymer nanocomposite materials in accordance with the present invention, both the dielectric loss tangent $\delta_d$ and the magnetic loss tangent $\delta_m$ are very low. In a particular embodiment of the nanocomposite material of the present invention, tan $\delta_d$<0.05 and tan $\delta_m$<0.05.

In comparison, the nanocomposite materials known in the prior art exhibit much higher dielectric and/or magnetic loss tangents. For example, all other microwave nanocomposite materials currently known in the prior art are utilized as microwave absorbers, as they exhibit high loss properties (i.e. lossy), within a certain range of frequencies of interest, thereby converting the received microwave radiation into a loss, i.e. heat generated. In contrast, the nanocomposite materials developed by the inventive process are low-loss and as such, can be used to build low-loss microwave device, such as filters, couplers, splitters, antennas, etc.

The inventive composite materials and the method of making the materials establishes a new class of engineered (moldable or 3D printable) electromagnetic or RF materials with adjustable magnetic permeability, $\mu_r$, between 2 and 200, depending upon the type of fillers and their associated loading %, while retaining the desirable low-loss characteristics of the material, wherein both the dielectric loss tangent $\delta_d$ and the magnetic loss tangent $\delta_m$ are less than about 0.05.

The combination of high permeability and low-loss tangents attainable with the inventive material may be achievable below a certain cutoff frequency. For example, for near-field magnetic induction based communication, a magnetic permeability greater than about 100 and loss tangents of less than about 0.05 are needed up to about 10 MHz, whereas, for microwave applications, a magnetic permeability of greater than about 3 and loss tangents of less than about 0.03 provides a significant improvement over the prior art, as the characteristics are sustained at frequencies up to a few GHz.

In addition, the low-loss nanocomposite materials are shown to exhibit perfect magnetic-dielectric behavior, wherein relative electric permittivity $\in'$ and relative permeability $\mu'$ are almost equal to each other, i.e. $\in' \cong \mu'$. As such, highly unique and unprecedented magneto-dielectric properties are provided by the nanocomposite materials of the present invention. For example, when the relative magnetic permeability and relative electric permittivity are approximately equal to each other, the polymer nanocomposite material of the present invention provides a matched electromagnetic wave impedance in a wide band to that of free space (air), while simultaneously enabling miniaturization of the RF components (i.e. antenna) and performance enhancements, such as improved antenna gain, antenna radiation efficiency and radiation pattern.

The present invention illustrates the successful synthesis of three different thermoset low-loss polymer nanocomposites embedded with $CoFe_2O_4$ nanoparticles and a uniform particle dispersion has been achieved throughout the polymer matrix, as shown in the TEM images. Magnetic measurement data revealed superparamagnetic behavior at room temperature for all the PNCs. The important magnetic parameters, namely blocking temperature, coercivity and reduced remnant magnetization, do not vary with changing loading percentage of the NPs. A strategically designed multilayer microstrip linear resonator embedded with different loadings of PNC was chosen as a test fixture to evaluate the susceptibility of the microwave properties of the PNC under the influence of an externally applied magnetic field. For the device with 80 wt % loading a measured frequency tunability of 518 MHz, and marked enhancement of the quality factor from 2 to 11.46 (5.6 fold improvement) were achieved with an externally applied DC magnetic field of less than 4.5 kOe. The observed variations in the resonance frequency, insertion loss and quality factor of the fabricated device clearly indicate the high sensitivity of the device to magnetic bias fields. Significant microwave responses are observed for the highest CFO loading nanocomposite. On the contrary, devices with reduced loading of magnetic nanoparticles demonstrated much less severe changes in their measured responses, such as the resonance frequency and quality factor, under the influence of the externally applied DC magnetic field. Clearly, loading of PNCs beyond a certain threshold value might be preferred to enable great tunability of the nanocomposite material. However, the incorporation of higher levels of magnetic nanoparticles also slightly compromises the performance of the device by introducing additional losses. A design strategy taking into account all of the performance metrics would provide a guideline to achieve the best tradeoff between tunability and losses for this new class of highly-viscous solvent-free polymer-magnetic nanoparticle nanocomposite materials.

What is claimed is:

1. A superparamagnetic polymer nanocomposite material comprising:
   a solvent-free low-loss polymer; and
   single-domain magnetic $Fe_3O_4$ nanoparticles having a mean size of 8 nm±1 nm coated with a surfactant and substantially uniformly dispersed in the solvent-free low-loss polymer at a concentration between 30% w/w and 80% w/w, forming a superparamagnetic polymer nanocomposite material.

2. The superparamagnetic polymer nanocomposite material of claim 1, wherein a relative magnetic permeability of the superparamagnetic polymer nanocomposite material is greater than about 1.6 and the relative electric permittivity of the superparamagnetic polymer nanocomposite material is greater than about 5.5 for a frequency between 1 GHz and 6 GHz and under an applied DC magnetic field of approximately 1 kOe.

3. The superparamagnetic polymer nanocomposite material of claim 1, wherein a dielectric loss tangent of the superparamagnetic polymer nanocomposite material is less than or equal to about 0.05 for a frequency between 1 GHz and 6 GHz and under an applied DC magnetic field of approximately 1 kOe.

4. The superparamagnetic polymer nanocomposite material of claim 1, wherein a magnetic loss tangent of the superparamagnetic polymer nanocomposite material is less than or equal to about 0.05 for a frequency between 1 GHz and 6 GHz and under an applied DC magnetic field of approximately 1 kOe.

5. The superparamagnetic polymer nanocomposite material of claim 1, wherein the nanocomposite material forms a 20 μm-thick film on a substrate.

6. The polymer nanocomposite material of claim 1, wherein the concentration is 30% w/w.

7. The polymer nanocomposite material of claim 1, wherein the concentration is 50% w/w.

8. The superparamagnetic polymer nanocomposite material of claim 1, wherein the surfactant is selected from oleylamine and oleic acid.

9. The superparamagnetic polymer nanocomposite material of claim 1, wherein the solvent-free low-loss polymer comprises a copolymer and butadiene resin.

10. The superparamagnetic polymer nanocomposite material of claim 1, wherein the nanocomposite material forms a 3D freestanding structure.

11. The superparamagnetic polymer nanocomposite material of claim 1, wherein the concentration is 80% w/w.

12. A superparamagnetic polymer nanocomposite material comprising:
    a solvent-free low-loss polymer; and
    single-domain magnetic $CoFe_2O_4$ nanoparticles having a mean size of approximately 10 nm±1 nm coated with a surfactant and substantially uniformly dispersed in the solvent-free low-loss polymer at a concentration between 30% w/w and 80% w/w, forming a superparamagnetic polymer nanocomposite material.

13. The superparamagnetic polymer nanocomposite material of claim 12, wherein the concentration is 30% w/w.

14. The superparamagnetic polymer nanocomposite material of claim 12, wherein the concentration is 50% w/w.

15. The superparamagnetic polymer nanocomposite material of claim 12, wherein the concentration is 80% w/w.

16. The superparamagnetic polymer nanocomposite material of claim 12, wherein the single-domain nanocomposite material forms a 20 μm-thick film on a substrate.

* * * * *